Sept. 20, 1938.          H. J. HORN          2,130,392
                         VEHICLE WHEEL
                      Filed Aug. 5, 1936          2 Sheets-Sheet 1
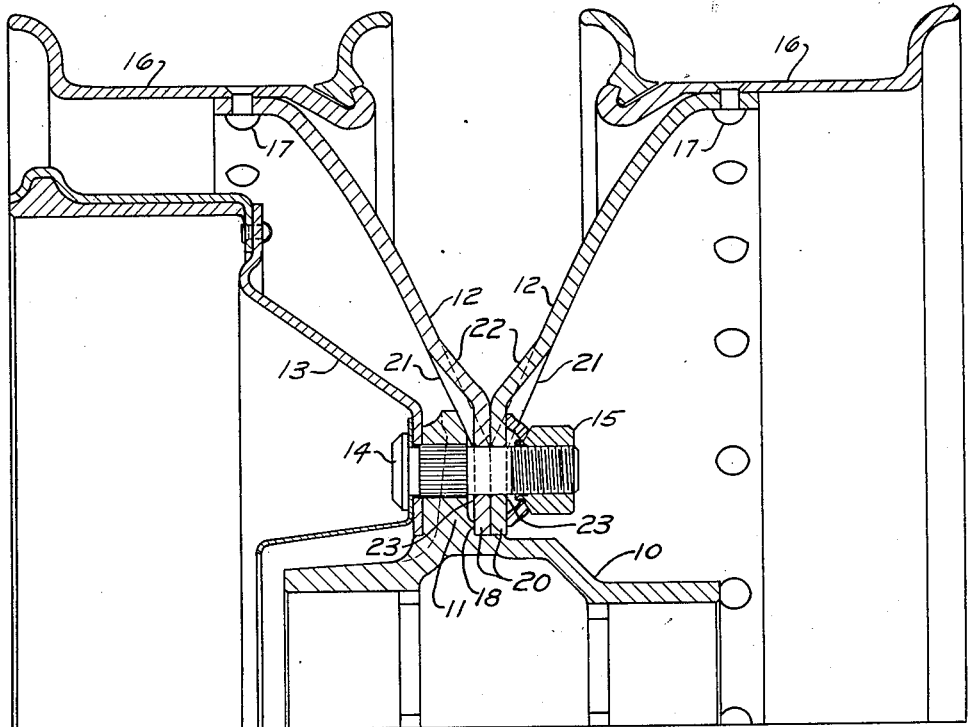
FIG. 1
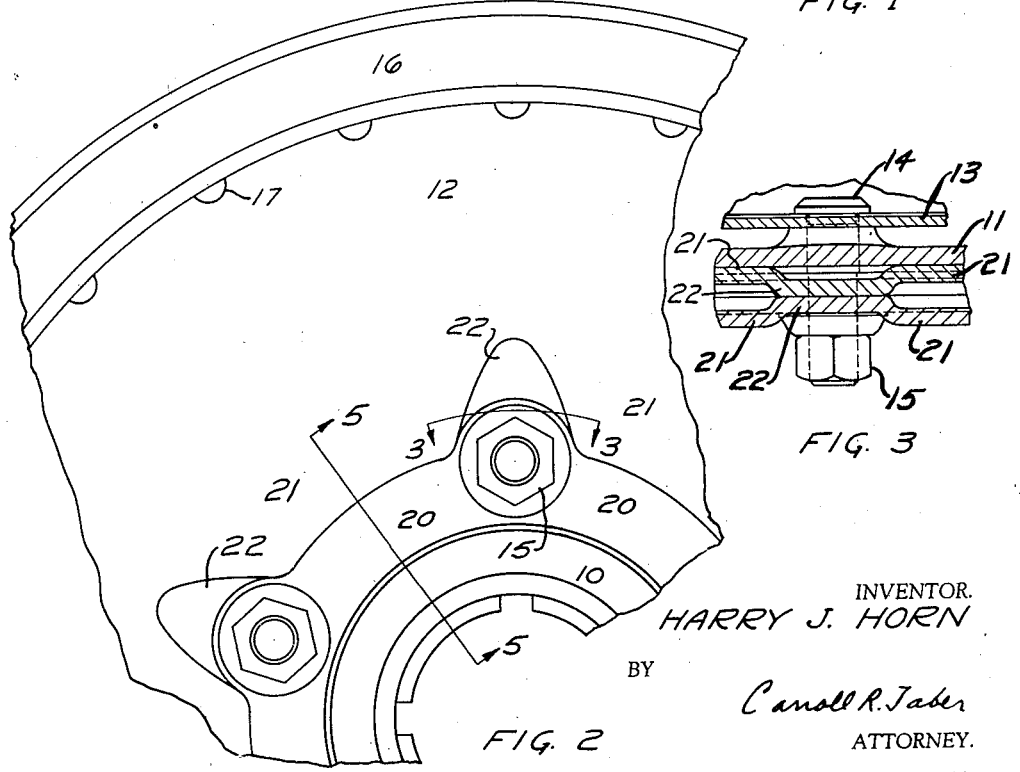
FIG. 2
FIG. 3
INVENTOR.
HARRY J. HORN
BY
Carroll R. Taber
ATTORNEY.

Patented Sept. 20, 1938

2,130,392

UNITED STATES PATENT OFFICE 2,130,392

VEHICLE WHEEL

Harry J. Horn, Lansing, Mich., assignor to Motor Wheel Corporation, Lansing, Mich., a corporation of Michigan Application August 5, 1936, Serial No. 94,419

7 Claims. (Cl. 301—9)

This invention relates to vehicle wheels, and more particularly to a novel construction permitting the mounting of one or two disks upon a hub so that the disk or disks are flexed when secured in position on the hub. Illustrative embodiments of the invention are shown in the drawings wherein—

Figure 1 is a fragmentary sectional view of a dual wheel construction showing a pair of wheel disks mounted upon a hub in accordance with the present invention;

Figure 2 is a partial front view of the wheel construction shown in Figure 1;

Figure 3 is a fragmentary sectional view taken on substantially the line 3—3 of Figure 2;

Figure 4:
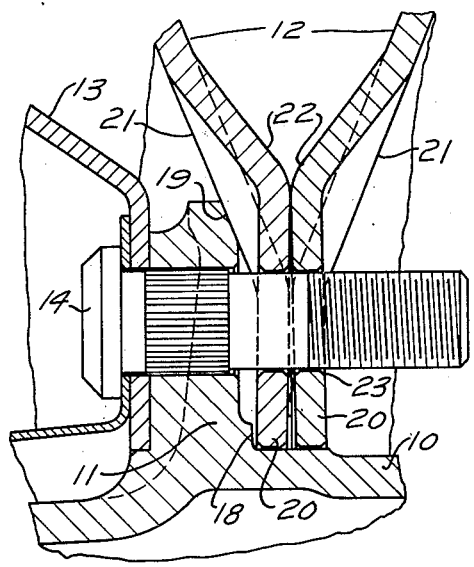
Figure 4 is an enlarged fragmentary sectional view of the construction illustrated in Figure 1 showing the relation of the parts before the clamp nut is threaded on the securing bolt.
Figure 5:
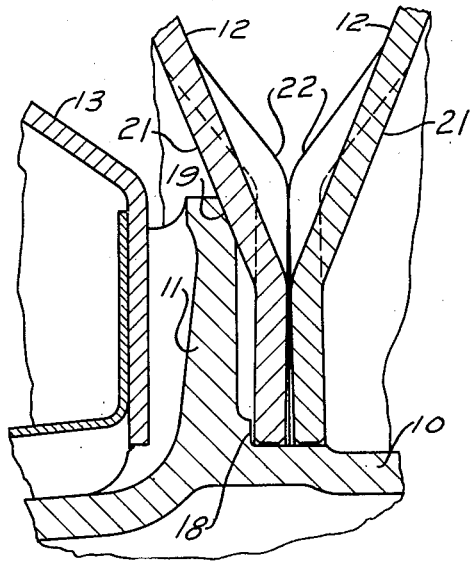
Figure 5 is an enlarged fragmentary sectional view taken on substantially the line 5—5 of Figure 2 before the clamp nut is threaded on the securing bolt.

The wheel illustrated in Figure 1 includes a hub 10 having a radial flange 11 to which is secured a pair of oppositely positioned disks 12 and a brake drum 13 by means of securing bolts 14 and clamp nuts 15. Conventional rims 16 are secured to the peripheries of the disks 12 by means of rivets 17.

The novel features of the construction illustrated in Figure 1 reside in the particular formation of the central portion of the disks 12 and their relation to the hub flange 11. These features can best be described by reference to Figure 4. As there shown the hub flange 11 has a radially extending face portion 18 at its base and an inclined face or seat 19 at its periphery. The disks 12 each have a radially extending central annular portion 20 and a generally cone shaped portion 21 radially outwardly of the central portion 20.

The cone shaped portion 21 of each disk is provided with a plurality of circumferentially spaced deformations 22 at its junction with the central portion 20. These deformations constitute radial extensions of the central portion 20 as clearly shown in Figures 2 and 4. Each of the disks 12 is provided with openings 23 adjacent the deformations 22 for the reception of the securing bolts 14 when the disks are mounted on the hub 10.

The disks 12 are mounted upon the hub 10 in opposed or reversed position with the deformations 22 and openings 23 arranged in axial alignment. Accordingly, the deformations 22 cooperate with the central portions 20 of the disks to provide a substantial zone of contact between the disks when the two disks are secured to the hub 10 as shown in Figure 1.

The configuration of the hub flange 11 and the adjacent portions of the disks 12 are diverse to the extent shown in Figure 4. As there shown the conical portion 21 of the inner disk 12 is contacting the inclined seat 19 of the flange 11, and the radially extending portions of the deformations 22 in each disk are contacting the corresponding portions of the other disk, while the central portions 20 of the disks are separated from each other and the central portion 20 of the inner disk is spaced from the radial face 18 of flange 11. When the clamp nuts 15 are threaded home upon the securing bolts 14 the central portions 20 of the disks are brought into contact with each other and the central portion 20 of the inner disk is brought into contact with the radial face 18 of the hub flange. (See Figures 1 and 3.) In order to bring these parts into contact with each other it is, of course, necessary to flex both of the disks 12. This flexing of the disks is to be desired since it makes for a more satisfactory securement of the disks to the hub and helps distribute the stresses created within the disks when the wheel of which they form a part is used.

Figure 6:
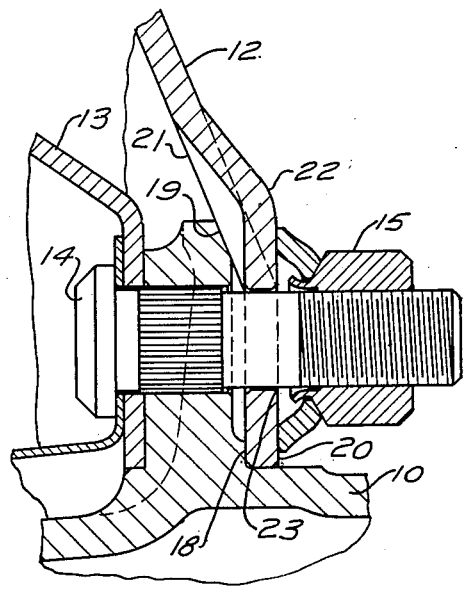
Figure 6 is a fragmentary sectional view of a wheel showing a single disk mounting embodying the present invention.
Figure 7:
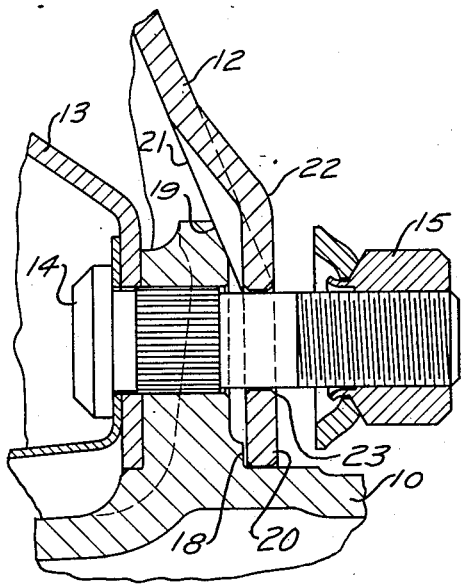
Figure 7 is a fragmentary sectional view corresponding to that of Figure 6 showing the relation of the parts before the clamping nut is threaded on to the securing bolt.

As shown in Figures 6 and 7 the disks 12 may be used separately as well as in dual relation as shown in Figure 1. When only one of the disks is used it is mounted with the radial extensions of the central portion 20 formed by the deformations 22 on the outside and the conical portion of the disk intermediate these deformations contacting the inclined seat 19 of flange 11. The clamp nuts 15 engage the disk 12 in the zones of the radial faces provided by the central annular portion 20 and the radial extensions thereof provided by the deformations 22.

From the foregoing description it will be apparent that the present invention provides a disk and hub construction whereby either one or two disks may be mounted upon the hub without sacrificing the advantage obtained by securing the disks to the hub under tension. The present invention also has the advantage of permitting the use of a hub flange of a radial extent limited only to that required to conveniently receive the securing bolts 12.

While only the preferred embodiments of the invention have been herein shown and described, it should be understood that the invention is not limited to these particular embodiments, but that it is co-extensive with the scope of the appended claims.

I claim:

1. A wheel disk comprising a substantially radially extending central annulus and a frusto-conical portion outwardly of the annulus, said frusto-conical portion being provided with circumferentially spaced deformations at its junction with the central annulus and forming radial extensions of said annulus, said radial extensions projecting radially outwardly a substantial distance beyond the periphery of the annulus, the disk being provided with an opening for the reception of securing means located adjacent the radially inner extremity of each of said deformations.

2. A wheel including, in combination, a hub having a radial flange provided with an inclined seat adjacent its periphery, a disk having a radially extending central annulus and a generally frusto-conical portion outwardly of the annulus, the radial extent of said annulus being less than the radial extent of said radial flange whereby the conical portion outwardly of said annulus engages the inclined flange seat when the disk is mounted on the hub, the frusto-conical portion of the disk being provided with a plurality of circumferentially spaced apart deformations adjacent its junction with the central annulus which form radial extensions of the central annulus, and a plurality of securing means for detachably connecting the disk to the hub flange and engaging the disk in each of said deformations.

3. A wheel including, in combination, a hub flange having a substantially radially extending face and an inclined annular seat, a disk having a substantially radially extending central portion and a generally frusto-conical portion outwardly thereof for engagement with said seat, the frusto-conical portion of the disk being provided with a plurality of circumferentially spaced deformations adjacent its junction with the central portion, which deformations form radial extensions of said central portion, and a plurality of means for clamping the said disk against the radial face of the hub flange engaging the disk in each of said deformations, the configuration of the disk and the hub flange being diverse to the extent that the disk is flexed when the central radial portion is clamped against the radial face of the flange.

4. A wheel including, in combination, a hub flange having a radial face and an inclined seat outwardly thereof, a disk having a radially extending central annulus and a conical shaped portion radially outwardly of the annulus for contact with said inclined seat, the conical portion of the disk being provided with a plurality of circumferentially spaced deformations in the region of its junction with the central portion, which deformations constitute radial extensions of said central portion, and a plurality of means for clamping the disk against the flange engaging the disk in the region of each of said deformations, the configuration of the hub flange and the disk in the region of the hub flange being diverse to the extent that the conical portion of the disk engages the inclined seat of the flange before the central portion of the disk engages the radial face of the flange when the disk is secured to the flange.

5. A wheel including, in combination, a hub having a radial flange including a radially extending side face and an inclined seat adjacent its periphery, a pair of wheel disks mounted on the flange, each of said disks including a central radially extending portion and a generally cone shaped portion outwardly thereof, the cone shaped portion of each of the disks being provided with a plurality of circumferentially spaced deformations adjacent its junction with the central portion which deformations constitute radial extensions of said central portions, the disks being mounted upon the hub with the conical portion of one of the disks engaging the inclined seat of the hub flange and with the deformations in the conical portion of each disk contacting the corresponding deformation in the other disk, and a plurality of securing means for detachably connecting the disk to the hub engaging the disk remote from the flange in the region of each of the deformations therein.

6. A wheel including, in combination, a hub having a flange provided with a radially extending face and an inclined seat at its periphery, a pair of disks mounted upon the hub, each of the disks including a substantially radially extending central portion and a cone shaped portion outwardly thereof, the radial extent of the central portion of each disk being such that the conical portions of the disks lie adjacent the inclined seat of the hub flange, the conical portion of each disk being deformed adjacent its junction with the central portion to provide a plurality of circumferentially spaced apart radial extensions of said central portion, the disks being mounted upon the hub in opposed position with the conical portion of one disk engaging the inclined seat of the hub flange and with the radial extensions of the central portion of each disk contacting the corresponding radial extension of the other disk, the configuration of the central portions of the disk and of the hub flange being diverse to the extent that the central portion of each of the disks is flexed when the disks are clamped tightly together and against the radial face of the hub flange, and a plurality of means for clamping the disks together and against the radial face of the hub flange engaging the disk remote from the hub flange in the region of each of the deformations therein.

7. A wheel including, in combination, a hub having a flange provided with a radially extending face and an inclined seat at its periphery, a pair of disks mounted upon the hub, each of the disks including a substantially radially extending central portion and a cone shaped portion outwardly thereof, the radial extent of the central portion of each disk being such that the conical portions of the disks lie adjacent the inclined seat of the hub flange, the conical portion of each disk being deformed adjacent its junction with the central portion to provide a plurality of circumferentially spaced apart radial extensions of said central portion, the disks being mounted upon the hub in opposed position with the conical portion of one disk engaging the inclined seat of the hub flange and with the radial extensions of the central portion of each disk contacting the corresponding radial extension of the other disk, the configuration of the central portions of the disks and of the hub flange being diverse to the extent that the said radial extensions of each disk contact each other and the conical portion of one disk contacts the inclined flange seat before the central portions of the disks contact each other and the central portion of the inner disk contacts the radial face of the flange when the disks are clamped to the flange, and a plurality of clamping means for securing the disks to the flange engaging the disk remote from the flange in the region of each of its radial extensions.

HARRY J. HORN.